Patented Oct. 7, 1947

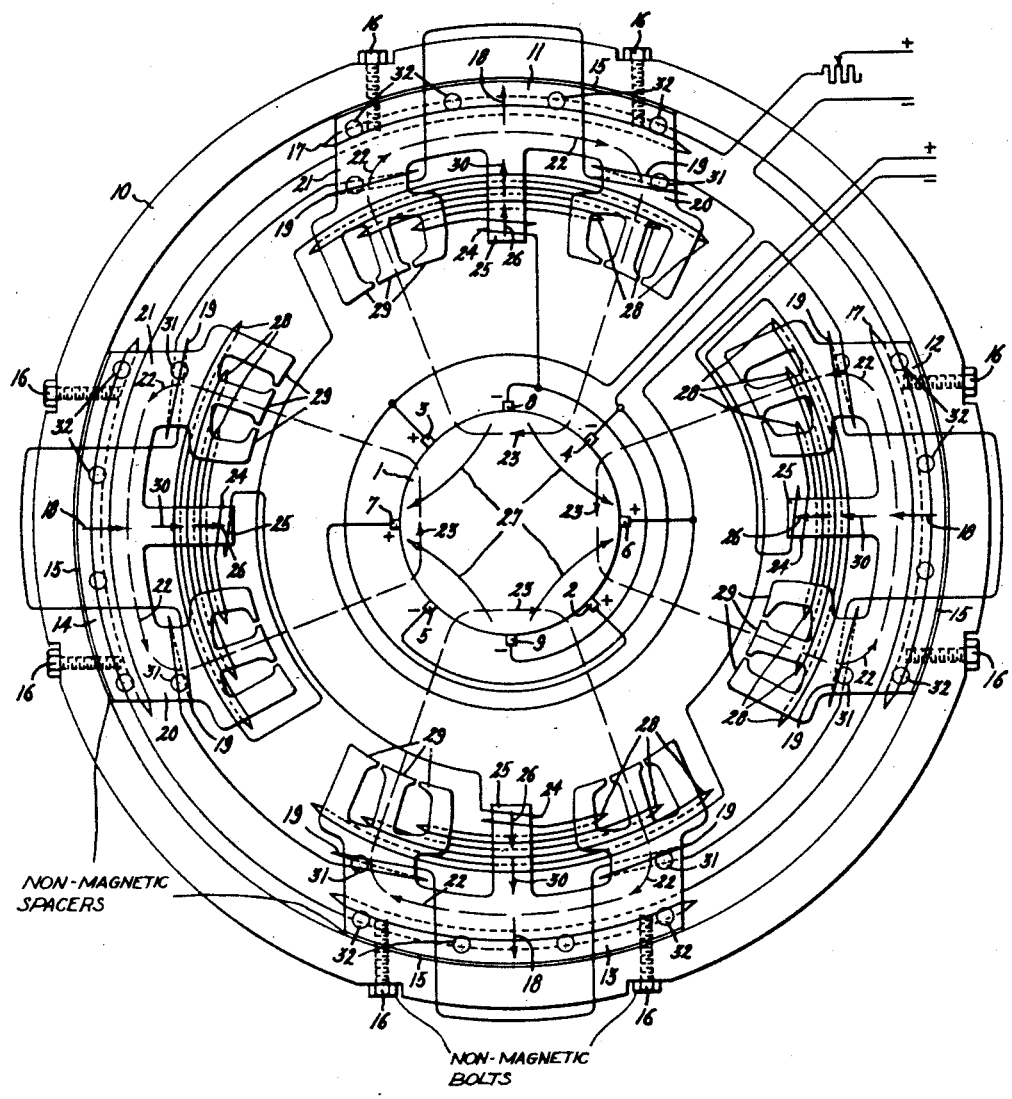

2,428,621

UNITED STATES PATENT OFFICE 2,428,621

DYNAMOELECTRIC MACHINE

Alec Fisher, Lynn, Mass., assignor to General Electric Company, a corporation of New York Application September 16, 1944, Serial No. 554,425

11 Claims. (Cl. 322—92)

My invention relates to dynamoelectric machines and in particular to machines of the amplidyne type.

An object of my invention is to provide an improved dynamoelectric machine of the amplidyne type.

Another object of my invention is to provide an improved and simplified armature reaction excited dynamoelectric machine with salient pole pieces and means for increasing the reluctance of the control field magnetic circuit over the primary excitation magnetic circuit.

A further object of my invention is to provide a dynamoelectric machine of the armature reaction excited type having an improved excitation system for increasing the rating of a machine for a given size.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing schematically illustrates a four-pole dynamoelectric machine of the armature reaction excited type provided with an embodiment of my invention.

In dynamoelectric machines of the armature reaction excited type, such as amplidyne machines, the rating of a machine depends to a large extent on the ability of the machine to operate for a large range over substantially the straight line portion of its magnetization curve without reaching saturation. In addition, on machines of large sizes where it is necessary to use four or more fundamental or main poles, it is desirable to provide salient pole pieces which may be secured to a conventional magnet frame. In this type construction, it also is desirable to utilize laminated pole pieces in order to reduce the losses in the field structure and to speed up the response of the machine to control variations. In my improved construction, these desirable features are incorporated and, in addition, I provide structural features which minimize mutual coupling of the primary excitation with the short-circuiting rivets or bolts which hold together the laminated pole pieces and provide for a larger air gap reluctance in the magnetic control path of the machine over the air gap reluctance path of the primary magnetic circuit in order to raise the saturation point of the magnetic curve for the control circuit of the machine.

In the illustrated embodiment of my invention, the dynamoelectric machine is provided with an armature 1 having a winding connected to a commutator of the conventional direct current type. A set of primary or quadrature brushes 2, 3, 4, and 5 is arranged about the commutator for providing a primary circuit through the armature winding, and a set of secondary or load brushes 6, 7, 8, and 9 electrically displaced about the commutator substantially 90 electrical degrees from the primary brushes is arranged to provide a secondary or load circuit through the armature winding. The field structure of the machine includes a stationary member with a magnet frame 10 of magnetic material and a plurality of pairs of pole pieces formed of laminations of magnetic material each having two main sets of polar projections. These pole pieces 11, 12, 13, and 14 are spaced with an effective air gap between the back face of the pole pieces and the magnet frame 10 by being spaced from the magnet frame 10 by non-magnetic spacer elements 15 and being secured in position by a plurality of non-magnetic bolts 16 extending into threaded openings in the pole pieces to a distance so as substantially not to extend into the main magnetic path of the primary circuit magnetic flux of the machine. The secondary or load characteristics of this machine are adapted to be controlled by suitable control field exciting windings illustrated by a control field exciting winding 17 arranged about the pole pieces to provide a component of excitation thereto, as indicated by the arrow 18, substantially along the secondary commutating axis of the armature winding. This control excitation has a magnetic path which extends through adjacent pole pieces through the armature of the machine and the magnet frame 10. Rotation of the armature in the field provided by this excitation induces a voltage between the primary brushes 2, 3 and 4, 5 which are substantially short circuited through a primary field exciting winding 19 which is arranged about the two main sets of polar projections 20 and 21 of each pole piece to produce a component of primary magnetic excitation, as indicated by the arrows 22, substantially along the primary or quadrature commutating axis of the armature winding in the same direction and cumulative with respect to the primary armature reaction produced by primary current flowing through the primary circuit of the armature, as indicated by the arrows 23. This primary excitation induces a voltage in the armature winding between the secondary or load brushes 6, 7 and 8, 9 which are adapted to be connected to the load circuit of the machine. In order to improve the commutation of the load or secondary brushes, a field exciting winding 24 is arranged about a polar projection 25 on each pole piece and is connected in series with the load or secondary brushes 8, 9 to provide a component of commutating magnetic excitation, as indicated by the arrows 26, substantially along the secondary commutating axis of the machine in the same direction as the control excitation 18. The passage of load current through the secondary circuit of the armature produces a secondary component of armature reaction, as indicated by the arrows 27, which opposes the control component of excitation 18. In order to increase the sensitivity of response of the machine to variations in the control field, a compensating field exciting winding 28 of the distributed type is arranged in slots formed in the pole faces between sets of polar projections 29 which comprise the ends of the main polar projections 20 and 21. This compensating field exciting winding is connected in series with the secondary brushes of the machine and the commutating field exciting winding 24 so that it is energized in accordance with the secondary current in the secondary armature circuit and produces a component of excitation, as indicated by the arrows 30, in opposition to the secondary component of armature reaction 27. The arrangement of this compensating field exciting winding 28 is such that it substantially neutralizes the effect of secondary armature reaction and substantially neutralizes or eliminates mutual coupling effects of the secondary armature reaction with the control excitation of the machine. In order to minimize mutual coupling of the main primary flux with any short-circuiting elements, the laminations of the pole pieces are secured together by rivets 31 and 32 which are arranged near the back edges and outer sides of the pole pieces substantially out of the normal main flux path of the primary excitation of the machine. These assembled pole pieces are secured to the magnet frame 10 in relation to the primary and secondary brushes in a position such that the two main sets of polar projections 20 and 21 of each pole piece extend substantially along or adjacent opposite ends of a primary commutating axis of the armature winding for substantially completing a magnetic circuit of the primary circuit magnetic flux through each individual pole piece and for completing a magnetic circuit of control flux through adjacent pole pieces, the non-magnetic spacers, and the magnet frame. In this manner, the reluctance of the primary magnetic flux is substantially reduced and the reluctance of the path of the control and residual magnetic excitation is increased, thereby decreasing the effect of residual magnetism upon the machine and raising the straight line or saturation "knee" in the magnetization curve in the secondary or load magnetic circuit of the machine. In some instances, it may be found desirable to make the pole piece rivets 31 and 32 of relatively high resistance material, so as to minimize the short-circuit currents which may be induced therein by the relatively small control flux of the machine, thereby further improving the speed of response of the machine. This type stationary member construction also provides the advantage of permitting the use of preformed coils for the pole piece field exciting windings which can be assembled on the pole pieces before they are assembled in the magnet frame and then the coils may be suitably connected together.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine of the amplidyne type having an armature with a winding and a commutator connected thereto, means including a set of primary brushes and a set of secondary brushes electrically displaced about said commutator from said primary brushes for providing a primary circuit and a secondary circuit respectively through said armature winding, a stationary member having a plurality of pole pieces formed of laminations of magnetic material with two main polar projections for each pole piece, and means including a control field exciting winding arranged to provide a component of magnetic excitation along the secondary commutating axis of said armature winding for controlling the secondary characteristics of said machine, said pole pieces being arranged in a position relative to said brushes such that said two main polar projections of each pole piece extend adjacent opposite ends of a primary commutating axis of said armature winding for substantially completing the magnetic circuit of the primary circuit magnetic flux through each individual pole piece and for completing the magnetic circuit of control flux through adjacent pole pieces, said last mentioned magnetic circuit including a relatively high reluctance region in the path between adjacent pole pieces whereby the reluctance of the path of the control flux materially exceeds the reluctance of the path of primary circuit magnetic flux.

2. A dynamoelectric machine of the amplidyne type having an armature with a winding and a commutator connected thereto, means including a set of primary brushes and a set of secondary brushes electrically displaced about said commutator from said primary brushes for providing a primary circuit and a secondary circuit respectively through said armature winding, a stationary member including a frame of magnetic material and a plurality of pole pieces formed of laminations of magnetic material with two main polar projections for each pole piece, means including a control field exciting winding arranged to provide a component of magnetic excitation along the secondary commutating axis of said armature winding for controlling the secondary characteristics of said machine, means providing a relatively high reluctance joint for securing said pole pieces to said frame in a position such that said two main polar projections of each pole piece extend adjacent opposite ends of a primary commutating axis of said armature winding for substantially completing a magnetic circuit of the primary circuit magnetic flux through each individual pole piece and for completing a magnetic circuit of control flux through adjacent pole pieces and said frame, and means including a compensating field exciting winding for substantially neutralizing secondary current in said secondary armature circuit.

3. A dynamoelectric machine of the armature reaction excited type having an armature with a winding and a commutator connected thereto, a means including a set of primary brushes and a set of secondary brushes electrically displaced about said commutator from said primary brushes for providing a primary circuit and a secondary circuit respectively through said armature winding, a stationary member having a plurality of pole pieces with two main polar projections for each pole piece, means including a control field exciting winding arranged about said pole pieces to provide a component of magnetic excitation along the secondary commutating axis of said armature winding for controlling the secondary characteristics of said machine, and means including a non-magnetic spacer arranged between said pole pieces and said frame for substantially increasing the air gap reluctance of the path of control excitation over that of the primary magnetic excitation circuit, said pole pieces being arranged in a position relative to said brushes such that said two main polar projections of each pole piece extend adjacent opposite ends of a primary commutating axis of said armature winding for substantially completing the magnetic circuit of the primary circuit magnetic flux through each individual pole piece and for completing the magnetic circuit of control flux through adjacent pole pieces.

4. A dynamoelectric machine of the armature reaction excited type having an armature with a winding and a commutator connected thereto, means including a set of primary brushes and a set of secondary brushes electrically displaced about said commutator from said primary brushes for providing a primary circuit and a secondary circuit respectively through said armature winding, a stationary member having a plurality of pole pieces with two main polar projections for each pole piece, means including a control field exciting winding arranged about said pole pieces to provide a component of magnetic excitation along the secondary commutating axis of said armature winding for controlling the secondary characteristics of said machine, non-magnetic means arranged between said pole pieces and said frame for substantially increasing the air gap reluctance of the path of control excitation over that of the primary magnetic excitation circuit, said pole pieces being arranged in a position relative to said brushes such that said two main polar projections of each pole piece extend adjacent opposite ends of a primary commutating axis of said armature winding for substantially completing the magnetic circuit of the primary circuit magnetic flux through each individual pole piece and for completing the magnetic circuit of control flux through adjacent pole pieces, and means including a primary field exciting winding responsive to primary current in said primary armature circuit for providing a component of magnetic excitation in the same direction in said main polar projections as primary armature reaction due to primary current in said primary armature circuit.

5. A dynamoelectric machine of the amplidyne type having an armature with a winding and a commutator connected thereto, means including a set of primary brushes and a set of secondary brushes electrically displaced about said commutator from said primary brushes for providing a primary circuit and a secondary circuit respectively through said armature winding, a stationary member including a frame of magnetic material and a plurality of pole pieces formed of laminations of magnetic material with two main polar projections for each pole piece, means including a control field exciting winding arranged to provide a component of magnetic excitation along the secondary commutating axis of said armature winding for controlling the secondary characteristics of said machine, means substantially outside of the main path of primary circuit magnetic flux providing a high reluctance joint securing said pole pieces to said frame in a position such that said two main polar projections of each pole piece extend adjacent opposite ends of a primary commutating axis of said armature winding for substantially completing a magnetic circuit of the primary circuit magnetic flux through each individual pole piece and for completing a magnetic circuit of control flux through adjacent pole pieces, means including a compensating field exciting winding for substantially neutralizing secondary current in said secondary armature circuit, and means including a primary field exciting winding arranged about each main polar projection of each pole piece for providing a component of magnetic excitation in the same direction in said main polar projections as primary armature reaction due to primary current in said primary armature circuit.

6. A dynamoelectric machine of the amplidyne type having an armature with a winding and a commutator connected thereto, means including a set of primary brushes and a set of secondary brushes electrically displaced about said commutator from said primary brushes for providing a primary circuit and a secondary circuit respectively through said armature winding a stationary member having a plurality of pole pieces formed of laminations of magnetic material with two main polar projections for each pole piece, means including a control field exciting winding arranged to provide a component of magnetic excitation along the secondary commutating axis of said armature winding for controlling the secondary characteristics of said machine, said pole pieces being arranged in a position relative to said brushes such that said two main polar projections of each pole piece extend adjacent opposite ends of a primary commutating axis of said armature winding for substantially completing the magnetic circuit of the primary circuit magnetic flux through each individual pole piece and for completing the magnetic circuit of control flux through adjacent pole pieces, means for securing together the laminations of each pole piece arranged through said laminations substantially outside of the main path of primary circuit magnetic flux, means for substantially neutralizing secondary armature reaction produced by secondary current in said secondary armature circuit, and means including a primary field exciting winding responsive to primary current in said primary armature circuit and arranged about each main polar projection of each pole piece for providing a component of magnetic excitation in the same direction in said main polar projections as primary armature reaction due to primary current in said primary armature circuit.

7. A dynamoelectric machine of the amplidyne type having an armature with a winding and a commutator connected thereto, means including a set of primary brushes and a set of secondary brushes electrically displaced about said commutator from said primary brushes for providing a primary circuit and a secondary circuit respectively through said armature winding, a stationary member including a frame of magnetic material and a plurality of pole pieces formed of laminations of magnetic material with two main polar projections for each pole piece, means including a control field exciting winding arranged to provide a component of magnetic excitation along the secondary commutating axis of said armature winding for controlling the secondary characteristics of said machine, means substantially outside of the main path of primary circuit magnetic flux for securing said pole pieces to said frame in a position such that said two main polar projections of each pole piece extend adjacent opposite ends of a primary commutating axis of said armature winding for substantially completing a magnetic circuit of the primary circuit magnetic flux through each individual pole piece and for completing a magnetic circuit of control flux through adjacent pole pieces, means for securing together the laminations of each pole piece arranged through said laminations substantially outside of the main path of primary circuit magnetic flux, means including a compensating field exciting winding for substantially neutralizing secondary current in said secondary armature circuit, and means including a primary field exciting winding arranged about each main polar projection of each pole piece for providing a component of magnetic excitation in the same direction in said main polar projections as primary armature reaction due to primary current in said primary armature circuit.

8. A dynamoelectric machine of the armature reaction excited type having an armature with a winding and a commutator connected thereto, means including a set of primary brushes and a set of secondary brushes electrically displaced about said commutator from said primary brushes for providing a primary circuit and a secondary circuit respectively through said armature winding, a stationary member having a plurality of pole pieces formed of laminations of magnetic material with two main polar projections for each pole piece, means including a control field exciting winding arranged to provide a component of magnetic excitation along the secondary commutating axis of said armature winding for controlling the secondary characteristics of said machine, means including a non-magnetic spacer arranged between said pole pieces and said frame for substantially increasing the air gap reluctance of the path of control excitation over that of the primary magnetic excitation circuit, said pole pieces being arranged in a position relative to said brushes such that said two main polar projections of each pole piece extend adjacent opposite ends of a primary commutating axis of said armature winding for substantially completing the magnetic circuit of the primary circuit magnetic flux through each individual pole piece and for completing a magnetic circuit of control flux through adjacent pole pieces, means for substantially neutralizing secondary armature reaction produced by secondary current in said secondary armature circuit, and means including a primary field exciting winding responsive to primary current in said primary armature circuit and arranged about each main polar projection of each pole piece for providing a component of magnetic excitation in the same direction in said main polar projections as primary armature reaction due to primary current in said primary armature circuit.

9. A dynamoelectric machine of the armature reaction excited type having an armature with a winding and a commutator connected thereto, means including a set of primary brushes and a set of secondary brushes electrically displaced about said commutator from said primary brushes for providing a primary circuit and a secondary circuit respectively through said armature winding, a stationary member including a frame of magnetic material and a plurality of pole pieces formed of laminations of magnetic material with two main sets of polar projections for each pole piece, means including a control field exciting winding arranged to provide a component of magnetic excitation along the secondary commutating axis of said armature winding for controlling the secondary characteristics of said machine, means substantially outside of the main path of primary circuit magnetic flux for securing said pole pieces to said frame in a position such that said two main sets of polar projections of each pole piece extend adjacent opposite ends of a primary commutating axis of said armature winding for substantially completing a magnetic circuit of the primary magnetic flux through each individual pole piece and for completing a magnetic circuit of control flux through adjacent pole pieces, means for securing together the laminations of each pole piece arranged through said laminations substantially outside of the main path of primary circuit magnetic flux, means including a compensating field exciting winding arranged to provide a component of magnetic excitation along the secondary commutating axis of said armature winding for substantially neutralizing secondary armature reaction produced by secondary current in said secondary armature circuit, and means including a primary field exciting winding energized in accordance with primary current in said primary armature circuit and arranged about each main set of polar projections of each pole piece for providing a component of magnetic excitation in the same direction in said main polar projections as primary armature reaction due to primary current in said primary armature circuit.

10. A dynamoelectric machine of the amplidyne type having an armature with a winding and a commutator connected thereto, means including a set of primary brushes and a set of secondary brushes electrically displaced about said commutator from said primary brushes for providing a primary circuit and a secondary circuit respectively through said armature winding, a stationary member including a frame of magnetic material and a plurality of pairs of pole pieces formed of laminations of magnetic material with two main sets of polar projections for each pole piece, a non-magnetic spacer arranged between said pole pieces and said frame, means including non-magnetic bolts for securing said pole pieces to said frame in a position such that said two main sets of polar projections of each pole piece extend substantially along opposite ends of a primary commutating axis of said armature winding for substantially completing a magnetic circuit of the primary circuit magnetic flux through each individual pole piece and for completing a magnetic circuit of control flux through adjacent pole pieces, means including rivets arranged through said laminations substantially outside of the main path of primary circuit magnetic flux for securing together the laminations of each pole piece, means including a control field exciting winding arranged about said pole pieces to provide a component of magnetic excitation along the secondary commutating axis of said armature winding for controlling the secondary characteristics of said machine, means including a compensating field exciting winding energized in accordance with the secondary current in said secondary armature circuit and arranged as a distributed winding in slots between polar projections of said pole pieces to provide a component of magnetic excitation along the secondary commutating axis of said armature winding for substantially neutralizing secondary armature reaction produced by secondary current in said secondary circuit of said armature, and means including a primary field exciting winding energized in accordance with primary current in said primary armature circuit and arranged about each main set of polar projections of each pole piece for providing a component of magnetic excitation in the same direction as primary armature reaction due to primary current in said primary armature circuit.

11. A dynamoelectric machine of the armature reaction excited type having an armature with a winding and a commutator connected thereto, means including a set of primary brushes and a set of secondary brushes electrically displaced about said commutator from said primary brushes for providing a primary circuit and a secondary circuit respectively through said armature winding, a stationary member including a frame of magnetic material and a plurality of pairs of pole pieces formed of laminations of magnetic material with two main sets of pole projections for each pole piece, means including a control field exciting winding arranged about said pole pieces to provide a component of magnetic excitation along the secondary commutating axis of said armature winding for controlling the secondary characteristics of said machine, non-magnetic means for securing said pole pieces to said frame in a position such that said two main sets of polar projections of each pole piece extend adjacent opposite ends of a primary commutating axis of said armature winding for substantially completing the stationary member magnetic circuit of the primary circuit magnetic flux through each individual pole piece and for completing the stationary member magnetic circuit of control flux through adjacent pole pieces, means for securing together the laminations of each pole piece arranged through said laminations substantially outside of the main path of primary circuit magnetic flux, means including a compensating field exciting winding energized in accordance with the secondary current in said secondary armature circuit and arranged as a distributed winding in slots between polar projections of said pole pieces to provide a component of magnetic excitation along the secondary commutating axis of said armature winding for substantially neutralizing secondary armature reaction produced by secondary current in said secondary circuit of said armature, and means including a primary field exciting winding energized in accordance with primary current in said primary armature circuit and arranged about each main set of polar projections of each pole piece for providing a component of magnetic excitation in the same direction as primary armature reaction due to primary current in said primary armature circuit.

ALEC FISHER.

REFERENCES CITED

The following references are of record in the file of this patent:

UNITED STATES PATENTS

| Number | Name | Date |
| --- | --- | --- |
| 1,174,104 | Turbayne | Mar. 7, 1916 |
| 2,184,766 | Harding | Dec. 26, 1939 |
| 2,256,239 | Caldwell | Sept. 16, 1941 |
| 2,303,293 | Thomas | Nov. 24, 1942 |